United States Patent
Yin

(10) Patent No.: US 7,885,483 B2
(45) Date of Patent: Feb. 8, 2011

(54) IMAGE ALIGNMENT METHOD

(75) Inventor: Gung-Chian Yin, Hsin-chu (TW)

(73) Assignee: National Synchrotron Radiation Research Center, Hsin-Chu (TW)

( * ) Notice: Subject to any disclaimer, the term of this patent is extended or adjusted under 35 U.S.C. 154(b) by 1111 days.

(21) Appl. No.: 11/603,827

(22) Filed: Nov. 24, 2006

(65) Prior Publication Data

US 2008/0123995 A1    May 29, 2008

(51) Int. Cl.
  *G06K 9/32*  (2006.01)
  *G06K 9/00*  (2006.01)
  *G06K 9/62*  (2006.01)
  *G06K 9/68*  (2006.01)

(52) U.S. Cl. .................. 382/294; 382/151; 382/209; 382/218

(58) Field of Classification Search .............. None
See application file for complete search history.

(56) References Cited

U.S. PATENT DOCUMENTS

| | | | | |
|---|---|---|---|---|
| 5,675,672 A | * | 10/1997 | Nakabayashi | 382/318 |
| 5,839,440 A | * | 11/1998 | Liou et al. | 600/431 |
| 6,628,845 B1 | * | 9/2003 | Stone et al. | 382/294 |

* cited by examiner

*Primary Examiner*—Anand Bhatnagar
*Assistant Examiner*—Randolph Chu
(74) *Attorney, Agent, or Firm*—Rosenberg, Klein & Lee

(57) ABSTRACT

An image alignment method includes: fetching at least two images; calculating a relative displacement between those adjacent images by utilizing a phase correlation algorithm; calculating an absolute displacement between any one of those images and the first image of those images; and computing a common area of those images by utilizing the relative displacement and the absolute displacement, then deleting remainder portions of the image excluding the common area. In the present invention, the phase correlation algorithm can be utilized to process numerous noise signals so as to get a higher precision of the image alignment.

5 Claims, 3 Drawing Sheets

IMAGE ALIGNMENT METHOD

BACKGROUND OF THE INVENTION

1. Field of the Invention

The present invention generally relates to an image alignment method, and more particularly relates to an image alignment method utilizing a phase correlation method.

2. Description of the Prior Art

The microscopy technology has been evolved in many years and has made a tremendous contribution in the development of technology. During the recent decade, the rapid development of high-performance personal computers further contributes to the maturity and the application of the technology. Additionally, using optical sectioning (tomography) and digital image reconstruction to perform a three-dimensional micro-tomography has made a great impact on many fields.

In terms of a transmission electron microscope (TEM) and an X-ray microscopy, objects need to be taken with the different projection angles to produce the three-dimensional information and images, but all these data need precise image alignment. And the displacements of the original images is due to a mechanical shock or the defects, which are produced when the images are taken from different angles or owing to the location movement of the machine caused by the thermal drift. In a conventional way, the manual operation is utilized to overcome these issues, however, it is not only a waste of time but also easy to produce human errors. An improved conventional study, the cross-correlation method, is used to resolve the manual problem, nevertheless, another important issue is aimed at the images taken with different angles are not identical, which cannot be completely overcome.

SUMMARY OF THE INVENTION

In order to solve the aforementioned problems, one object of the present invention is to provide an image alignment method, wherein a phase correlation algorithm can be utilized to calculate the displacement of two images more accurately.

Another object of the present invention is to provide an image alignment method, wherein it utilizes the phase correlation algorithm to reconstruct the images without fetching the same images.

Another object of the present invention is to provide an image alignment method, wherein it utilizes the phase correlation algorithm to process most of the noisy area so as to align the images more precisely.

Another object of the present invention is to provide an image reconstruction method, wherein the misalignment problem due to the vibration and the wobble of the rotation stage in the tomography process can be resolved by utilizing an image alignment method performed by the phase correlation algorithm.

A further object of the present invention is to provide an image reconstruction method, wherein it utilizes an image alignment method performed by the phase correlation algorithm to resolve the photo quality problem due to the vibration during the digital image-capture device is operated.

Accordingly, one embodiment of the present invention provides an image alignment method including: fetching at least two images; calculating a relative displacement between those adjacent images by utilizing a phase correlation algorithm; calculating an absolute displacement between any one of those images and the first image of those images; and computing a common area of those images by utilizing the relative displacement and the absolute displacement, and deleting remainder portions of those images excluding the common area.

Another embodiment of the present invention provides an image reconstruction method including: fetching at least two images; calculating a relative displacement between those adjacent images by utilizing a phase correlation algorithm; calculating an absolute displacement between any one of those images and the first image of those images; computing a common area of those images by utilizing those relative displacement and those absolute displacement, and deleting remainder portions of those images exclusive of the common area; determining the rotation centers of those images; and reconstructing the three-dimensional data of those images.

Another embodiment of the present invention provides an image reconstruction method including: fetching at least two images; calculating a relative displacement between those adjacent images by utilizing a phase correlation algorithm; calculating an absolute displacement between any one of those images and the first image of those images; computing a common area of those images by utilizing those relative displacement and those absolute displacement, and deleting remainder portions of those images exclusive of the common area; and accumulating the common area of every image.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

The specific examples of the invention are described in detail as follow. However, it should be understood that the invention is not to be limited to the particular form disclosed herein.

Figure 1:
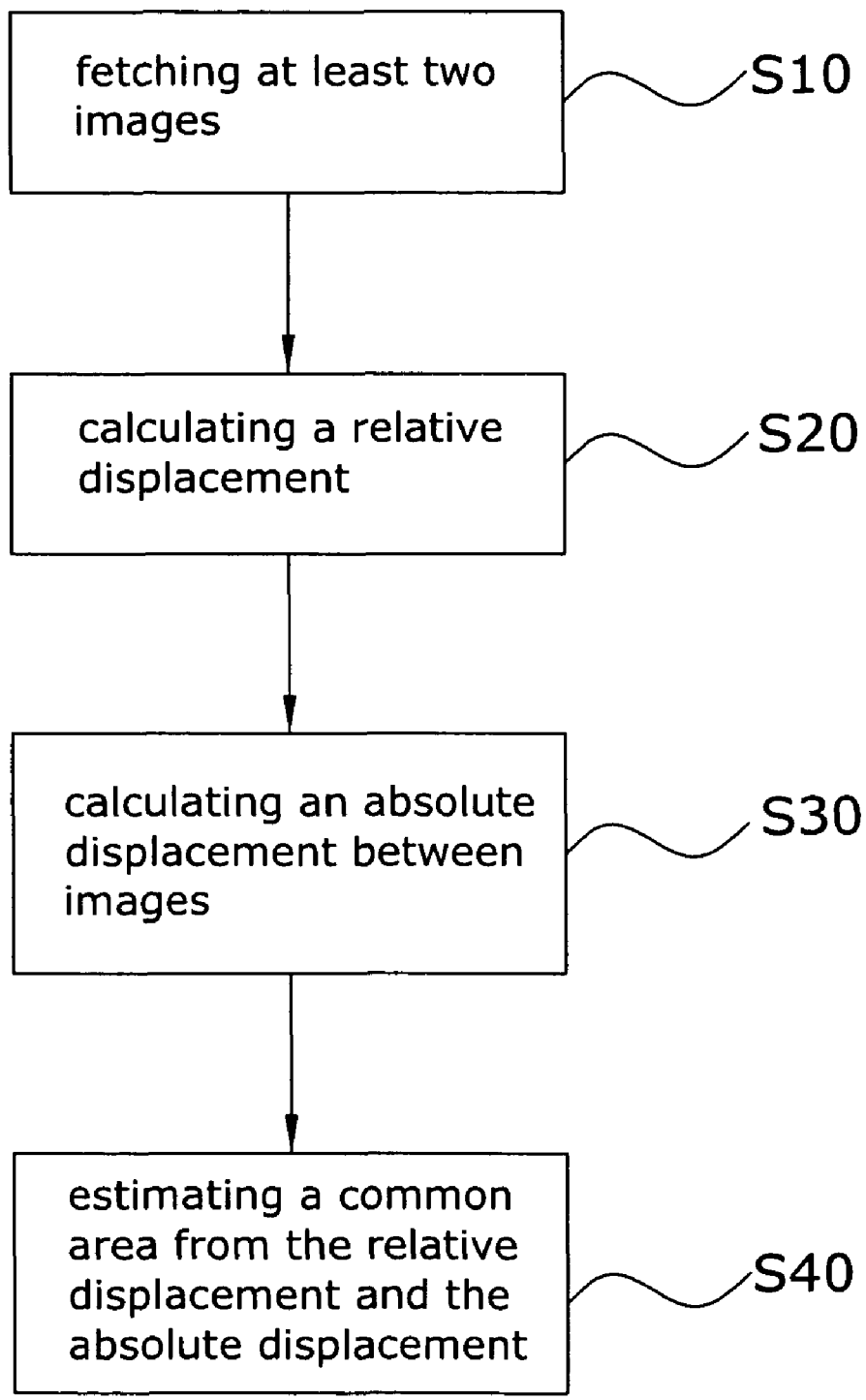
FIG. 1 is a flow chart of the image alignment method according to one embodiment of the present invention.

FIG. 1 is a flow chart of the image alignment method to illustrate one embodiment of the present invention. Such as shown in FIG. 1, first, fetching at least two images $p_i$ and $p_{i+1}$ from the taken pictures (S10) where $p_i$ denotes the ith image, i=1 to N, and N is a positive integer which denotes the number of images, wherein, according to different applications, these pictures of the same object can be shot at the same angle or different angles. Going on the next step, calculating a relative displacement between any two consecutive images $p_i$ and $p_{i+1}$ (S20), wherein the relative displacement can be estimated by utilizing a phase correlation algorithm. Further, calculating an absolute displacement between any one of these images and the first image (S30), such as calculating a position shift between $p_1$ and $p_i$ where $p_1$ denotes the $1^{st}$ image and $p_i$ denotes the ith image which could be any one of the images, wherein the absolute displacement can be computed by a phase correlation algorithm. In another embodiment, the absolute displacement also can be figured out by accumulating the relative displacement between every two consecutive images $p_i$ and $p_{i+1}$ between the image $p_1$ and $p_{i+1}$ to obtain the position shift between $p_1$ and $p_{i+1}$. Finally, a common area of the whole images can be worked out by utilizing the relative displacement and the absolute displacement, and then the remainder portions of these images excluding the common area is deleted (S40).

Continuing the above description, before calculating the relative displacement or the absolute displacement, the aforementioned method further includes performing an image preprocessing operation for these images. In one embodiment, the image preprocessing operation includes any one of a sharpening process, a smoothing process, and a noise removal process. Wherein the image preprocessing operation is conduced to process some unnecessary noise of these images, or probably to enhance the signal of these images to increase the accuracy of the following image alignment or even the accuracy of the image reconstruction.

In one embodiment, the method of performing the forementioned relative displacement or the absolute displacement utilizes a Fourier transform method, a fast Fourier transform method, or the operation of the Fourier transform method and the fast Fourier transform. The operation method is shown as equation (1) in the following: first, performing the Fourier transform of two images, such as transforming the image p1 and image p2 to two Fourier transform values, F[p1] and F[p2]; next, calculating the correlation of these two images, i.e., multiplying one Fourier transform value F[p1] by the complex conjugate of another Fourier transform value F[p2], such as the mathematic expression F[p1](F[p2])*; more, dividing the product computed above by the modului of these two images, such as the mathematic expression $$\frac{F[p1](F[p2])^*}{|F[p1]||F[p2]|};$$

furthermore, multiplying a spatial filter, such as G, in the present embodiment, the spatial filter is a low-pass filter; then, performing the inverted Fourier Transform so as to find the maximum value in the spatial coordinates, which is the shift of these two images.

$$[p1, p2]_{shift[x,y]} = \text{Max}\left\{F^{-1}\left[\frac{F[p1](F[p2])^*}{|F[p1]||F[p2]|}\right]G\right\} \quad \text{equation (I)}$$

Wherein
p1: one image
p2: another image;
G filter; and
x,y: x denotes the x-coordinate of the maximum displacement of p1 and p2; and y denotes the y-coordinate of the maximum displacement of p1 and p2.

In the meantime, this image alignment method can be applied to different embodiments of image reconstruction method are described.

Figure 2:
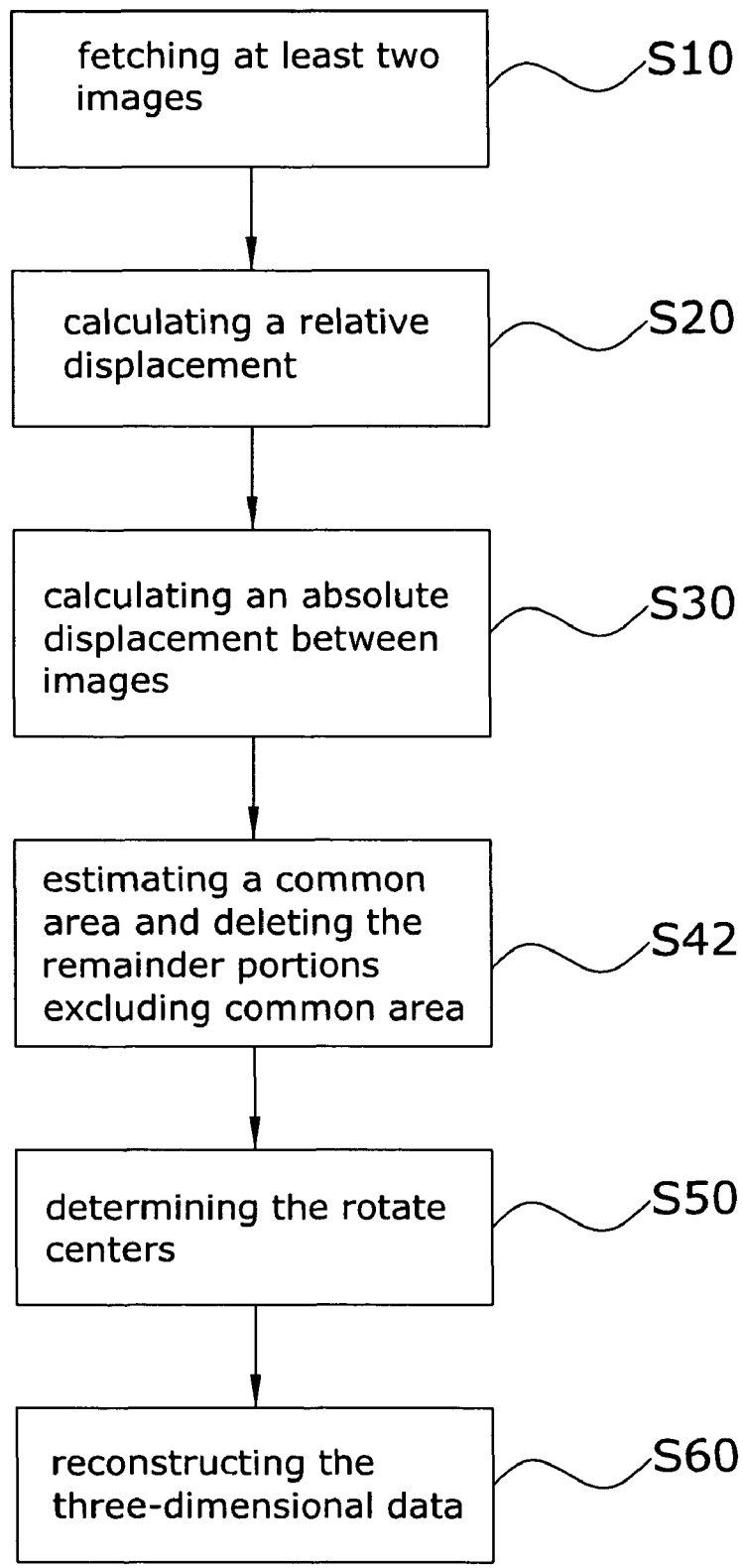
FIG. 2 is a flow chart of the image reconstruction method according to the first embodiment of the present invention.

FIG. 2 is a flow chart of the image reconstruction method to illustrate one embodiment of the present invention. In the embodiment, the image alignment method mentioned above is applied to the micro-tomography. Such as shown in FIG. 2, first, fetching at least two images from these taken pictures (S10), wherein these pictures are taken from the same object and shot at different angles. Going on the next step, calculating a relative displacement between these adjacent images (S20), wherein the relative displacement can be performed by utilizing a phase correlation algorithm, such as a Fourier transform, a fast Fourier transform, or the operation of these two methods. Further, calculating an absolute displacement between any one of these images and the first image (S30), that is, based on the first image, calculating the displacements between every one image and first image (called the absolute displacement). In one embodiment, the operation of the absolute displacement is also performed by the phase correction algorithm. Next, estimating a common area of the whole images by utilizing the relative displacement and the absolute displacement, and then deleting remainder portions of these images excluding the common area (S40). In the meantime, the process of the image alignment is completed. Next, determining the rotation centers of those images (S50). Finally, reconstructing the three-dimensional data of the image (S60).

Continuing the above description, before calculating the relative displacement or the absolute displacement, the aforementioned method further includes performing an image preprocessing operation for these images. In one embodiment, the image preprocessing operation includes any one of a sharpening process, a smoothing process, and a noise removal process. In one embodiment, the method of determining the rotation centers is to decide the rotation sinograms of the images, but it is not limited to the one described above.

In one embodiment, further including interpolating or extrapolating the images before reconstructing the three-dimensional data. Wherein the images are interpolated or extrapolated to set the pixel number to $2^k$, and k is a positive integer. Next, a filtered-back-projection (FBP) method based on Fourier slice theorem can be performed to reconstruct the three-dimensional data. However, it is not limited to the interpolation or extrapolation of data to set the pixel number to $2^k$. In another embodiment, method of paddling zero to the data to set the pixel number to $2^k$ can be worked too.

Figure 3:
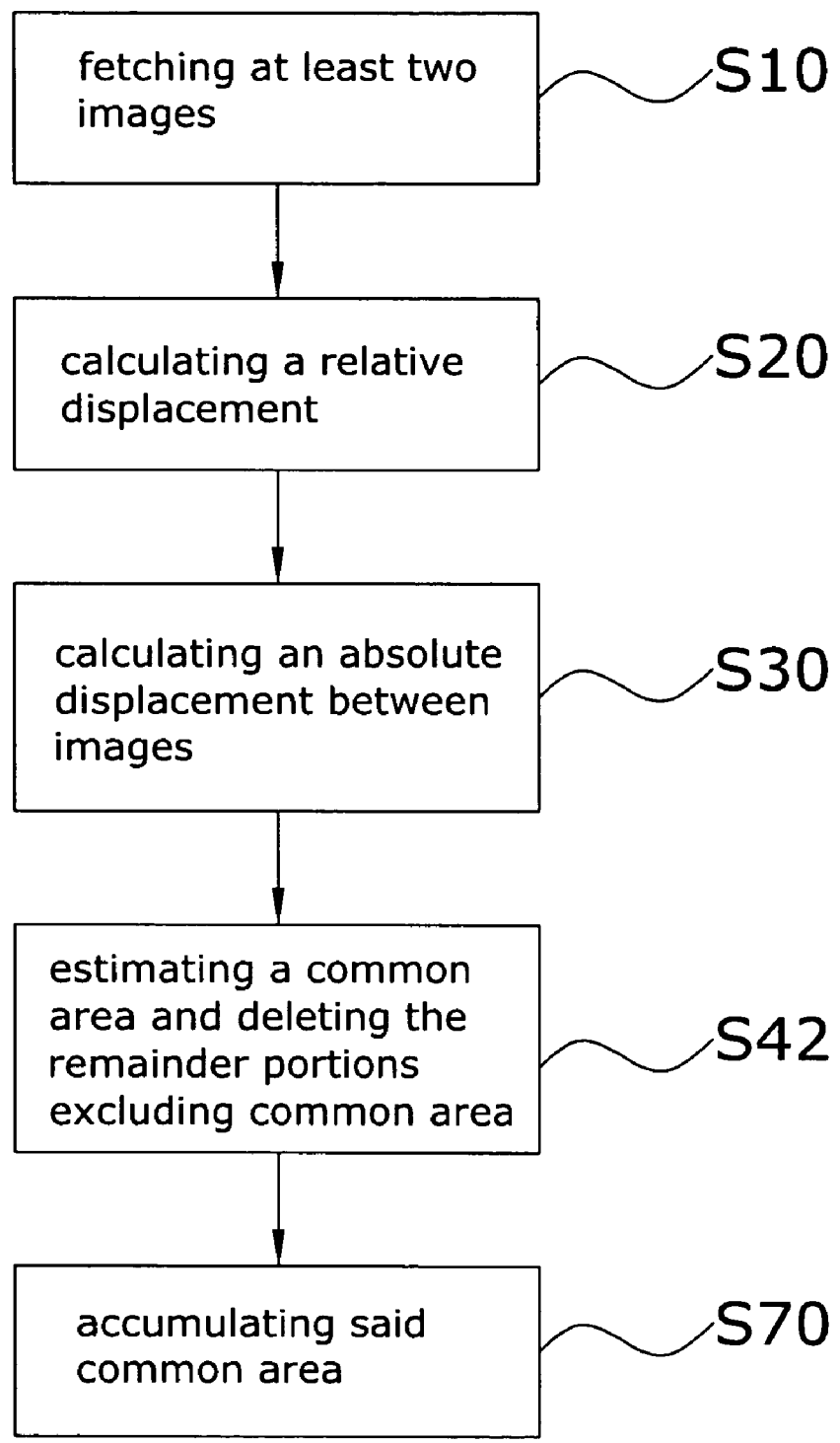
FIG. 3 is a flow chart of the image reconstruction method according to the second embodiment of the present invention.

Referring to FIG. 3, FIG. 3 is a flow chart of the image reconstruction method to illustrate the second embodiment of the present invention. In the embodiment, the aforementioned image alignment method is applied on the steady shot function of the digital image-capture device such as a digital camera for the continuous shooting. First, changing the exposure time t to t/N. In the predetermined exposure time, fetching N or less than N pictures, wherein N is a positive integer. Such as shown in the figure, the steps (such as S10, S20, S30, and S40) before calculating the common area of the image are the same as the aforementioned image reconstruction, it does not give unnecessary details here. After the common area is working out, accumulating the common areas of every images to enhance the signal-to-noise ratio (SNR). This method is to shorten the exposure time so as to fetch the highly noisy but clear image. These images can be processed by an image preprocessing method that includes any one of a sharpening process, a smoothing process, and a noise removal process. After image preprocessing, aligning the images by the phase correlation algorithm, then accumulating the image of the common area to enhance the SNR so as to perform the steady shot function of digital image-capture device with short exposure time and clear image.

On consideration for the restriction of the data, central processing unit, and memory of the digital image-capture device itself, the image fetching method can be fetching two images which can be aligned in serial; calculating the common area; and adding the computed common area to one image, and deleting another image to save the memory space. After these processes, fetching next image to perform the same processes. By this way, the common area of any two successive images can be accumulated to the last one so as to reconstruct the image.

Accordingly, one of features is to utilize the phase correlation algorithm to calculate the displacement of images to effectively perform the image alignment. The image alignment method can be applied in the preprocessing of other image reconstruction methods, such as the electron microscope, the X-ray microscope, the tomography, or the microtomography. Furthermore, owing to the relative vibration between the digital image-capture device and the photographed object or because the photographed object moves in a high speed, the image alignment method also can be applied on the digital image-capture device, such as digital cameras or mobile camera phones. Additionally, the application of the method is not limited to the aforementioned ones; it can be applied in other system that needs image alignment process.

To sum up the forgoing descriptions, the present invention utilizes an image alignment method using a phase correlation algorithm to fast and precisely perform the operation for the displacement of two images. In addition, the image alignment method can be utilized to resolve the image alignment problem with similar images. More, the phase correlation algorithm can be used to process most of the noisy area so as to align the images more precisely. Further, the misalignment problem due to the vibration and wobble of the rotation stage in the tomography process can be resolved by utilizing an image alignment method performed by the phase correlation algorithm. Furthermore, the image alignment method is performed by the phase correlation algorithm to resolve the photo quality problem due to the vibration when the digital image-capture device is operated.

While the present invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. An image alignment method comprising:
fetching at least two consecutive images from images captured from an object sequentially;
calculating a relative displacement between said two consecutive images, wherein said relative displacement is a shift between any two consecutive images of said images which can be calculated by a phase correlation algorithm utilizing a filter G to pass low-frequency signals, and is estimated by the following equation:

$$[p1, p2]_{shift[x,y]} = \text{Max}\left\{F^{-1}\left[\frac{F[p1](F[p2])^*}{|F[p1]||F[p2]|}\right]G\right\}$$

where $p^1$ and $p^2$ are any two consecutive images of said images, F is a Fourier transfrom function, G is said filter, x denotes the x-coordinate of the maximum displacement of $p^1$ and $p^2$, and y denotes the y-coordinate of the maximum displacement of $p^1$ and $p^2$;
calculating an absolute displacement which is a shift between any one of said images and the first image of said images; and
computing a common area of said images by utilizing said relative displacement and said absolute displacement, and deleting remainder portions of said images excluding said common area.

2. The image alignment method according to claim 1, further comprising performing an image preprocessing operation for said images before calculating said relative displacement or said absolute displacement.

3. The image alignment method according to claim 2, wherein said image preprocessing operation comprises any one of a sharpening process, a smoothing process, and a noise removal process.

4. The image alignment method according to claim 1, wherein said absolute displacement is calculated by utilizing a phase correlation algorithm.

5. The image alignment method according to claim 1, wherein said Fourier transform function is a fast Fourier transform function.

* * * * *